Figure 1:
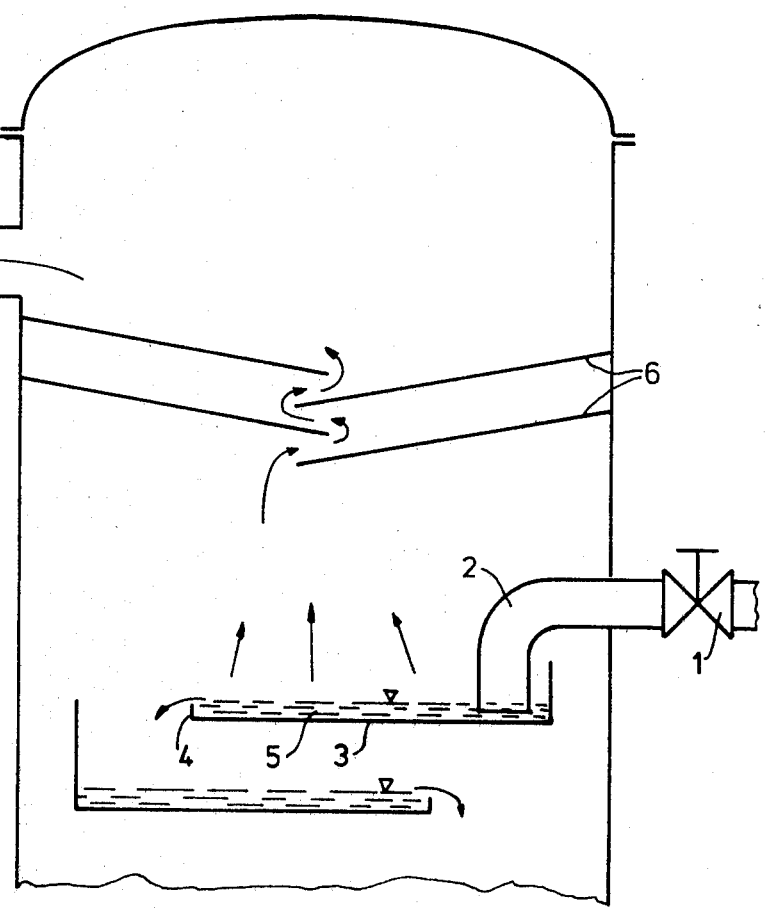

United States Patent [19]

Muschelknautz et al.

[11] 4,339,570

[45] Jul. 13, 1982

[54] PROCESS FOR THE PRODUCTION OF POLYESTERS

[75] Inventors: Edgar Muschelknautz; Roland Vogelsgesang, both of Leverkusen; Helmut Ohse, Dormagen; Hans Westermann, Marl; Eckhard Möller, Marl; Klaus Hachmann, Marl; Wilhelm Schiemann, Marl; Bernt Kesper, Dorsten, all of Fed. Rep. of Germany

[73] Assignee: Bayer Aktiengesellschaft, Leverkusen, Fed. Rep. of Germany

[21] Appl. No.: 273,545

[22] Filed: Jun. 15, 1981

[30] Foreign Application Priority Data

Jul. 5, 1980 [DE] Fed. Rep. of Germany ....... 3025574

[51] Int. Cl.³ ............................................. C08G 63/02
[52] U.S. Cl. .................................... 528/272; 528/274
[58] Field of Search ............................... 528/272, 274

[56] References Cited

U.S. PATENT DOCUMENTS

| | | | |
|---|---|---|---|
| 3,359,074 | 12/1967 | Dobo | 528/272 |
| 3,402,023 | 9/1968 | Dobo | 528/272 |
| 3,644,294 | 2/1972 | Siclari et al. | 528/272 |
| 4,100,142 | 7/1978 | Schaefer et al. | 528/272 |

*Primary Examiner*—Lucille M. Phynes
*Attorney, Agent, or Firm*—Sprung, Horn, Kramer & Woods

[57] ABSTRACT

In the production of polyesters by introduction of precondensates on to a first plate of a column reactor product quality is improved and operating time is increased in that spontaneous flash evaporation of the precondensate takes place in a so-called entry box, before the introduction on to the first plate of the column reactor, and in that separation of the liquid component from the gaseous component is subsequently carried out by centrifugal force in a so-called annular chamber.

7 Claims, 5 Drawing Figures

PROCESS FOR THE PRODUCTION OF POLYESTERS

This invention relates to a process for the production of polyesters by the introduction on to a first plate of a column reactor of precondensates obtained from a transesterification of dicarboxylic acid dialkyl esters with diols or from an esterification of dicarboxylic acids with diols, optionally with the addition of catalysts, and further condensation in the column reactor by means of a suitable apparatus which ensures that the evaporation of diols which normally takes place spontaneously due to the pressure gradient between the precondensate supply and the reactor will be controlled so that the first reaction plate will be completely and thoroughly wetted but splashing and soiling of the reactor walls will be avoided.

The invention also relates to a process for the complete removal of droplets of product from the stream of vapour in the condensation reactor, which consists mainly of diols.

The polyesters, dicarboxylic acid dialkyl esters, dicarboxylic acids, diols and catalysts mentioned here are those conventionally used. The process is particularly suitable for the production of polyethylene terephthalate and polybutylene terephthalate from terephthalic acid or dimethylterephthalate and glycol or butane-1,4-diol in the presence of the usual catalysts (see R. E. Wilfong, J. of Polym. Sc. 54, page 385 (1961)).

Most of the known reactors for the continuous condensation of reaction mixtures obtained from the transesterification of dicarboxylic acid dialkyl esters with diols have mechanically driven installations in the form of rods, nets, shafts or ploughshares to ensure more thorough mixing and increase the available surface area of the reaction product, although apparatus with stirrer devices in the form of rotating discs or of double shaft screws are also known.

The reaction mixture is in many cases introduced from below into the reactor, which is usually placed horizontally, and it enters a liquid layer of considerable thickness which may already have become more viscous than the inflowing precondensate due to the reaction which has taken place, with the result that the effects of spontaneous evaporation are for the most part suppressed during the introduction of precondensate into these reactors, so that no special difficulties are encountered in this region.

These reactors are generally subdivided into several chambers which enable the temperature and pressure during the reaction to be controlled so that the quantity of vapours released in the individual chambers as condensation progresses can be adapted to the space provided for them by the construction of the reactors, whereby the gas velocities can be kept so low that the quantity of substances swept up with the vapours in the form of droplets is negligible.

Other processes are known, in which continuous condensation is carried out in simple plate columns. In such reaction columns, however, much greater care must be exercised than in the previously known processes, not only in the introduction of reaction mixture into the reactor and the discharge of vapours but in particular the separation of liquid constituents still contained in the stream of vapours.

FIG. 1 shows a construction of such a plate column for the condensation of polyester products.

The preliminary product is generally conducted to a first reactor plate 3 by way of a restrictor valve 1 and a simple elbow pipe 2 whose curvature, length and cross-section are adapted to the quantity of product. The jet issuing from the pipe encounters the reactor plate at a distance from the back of the plate amounting to approximately one tenth of the whole length of the plate. The lower end of the elbow pipe is immersed up to about half its height in the liquid layer 5 on the reactor plate, the thickness of which layer is determined by the height of an overflow dam 4. The column is under a low pressure which is approximately 1/20 to 1/25 the pressure in the front of the restrictor 1. The reactor plates are generally heated but it is also customary to use heating means in the form of a nest of tubes through which heating medium flows transversely to the direction of flow of reaction mixture.

The size and number of reactor plates depends on the desired molecular weight of the end product. The temperature control and thickness of the layer of liquid on the column plate are also adapted to the desired properties of the polyester end product, and additional pressure stages may be provided for this purpose in such a column reactor.

Due to the steep pressure drop at the restrictor valve 1 of from 100–250 mbar to 5–15 mbar, considerable quantities of gas are already liberated in the elbow pipe 2 by evaporation of 2 to 10% of the stream of product introduced, and this quantity of gas flows through the liquid layer at a high velocity and carries small droplets of product with it. These droplets encounter the heated walls of the reactor and may therefore cause contamination of the product, for example if they undergo cracking and spall from the walls to re-enter the stream of product.

A large proportion of the droplets is carried away by the vapours. To avoid substantial loss of product, these droplets are in part separated in the upper part of a reactor by drip separators 6 e.g. in the form of sloping plates, so that they return to the product stream.

The angle of inclination of such baffle plates and the cross-section of the stream released by them depend on the vapour quantities and the extent to which the vapour is charged with product droplets.

In spite of strenuous efforts, it has not hitherto been possible in the known plate columns, to satisfy present day requirements for long operating periods (>6 months) because there is still too much spraying and splashing which causes considerable contamination of the product and because too much product is still discharged from the reactor with the vapour and must be deposited in the following scrubbers, which, apart from the loss of product involved, leads to the formation of deposits and blockage in the pipes, scrubbers and auxiliary apparatus so that periodic, time consuming, costly cleaning cycles become necessary.

It was therefore necessary to solve the problem of introducing the preliminary product in such a manner that soiling of the reactor walls by product droplets driven out of the liquid layer by the spontaneous evaporation of diols would be, to a large extent prevented.

Since the vapour which is liberated from the reactor plate as the reaction progresses carries droplets of product with it, another problem to be solved was to improve the separation of these droplets from the vapour stream leaving the reactor so that the outlet region of the reactor and the following subsidiary and auxiliary apparatus would not be contaminated. It should then be possible not only to improve the quality of the polyester end product but also considerably to increase the operating time of the column reactor and to render the process considerably more economical.

It has now been found that contamination of the reactor by droplets sprays and hence also of the product, can, to a large extent, be avoided if the spontaneous flash evaporation of the precondensate due to the pressure gradient between the precondensation reactor and the column reactor takes place in a closed chamber, the so-called entry box, before the precondensate is introduced to the first plate of the column reactor, and if separation of the liquid component from the gaseous component is subsequently carried out by centrifugal force in a functionally separate area, the so-called annular chamber.

It has also been found that the droplets can be effectively separated from the vapour stream by means of a spin separator.

According to the invention, the flash evaporation of precondensate may be carried out using a cyclone consisting of an entry box and a separation portion.

Cyclones are also used in German Offenlegungsschrift No. 2 361 236 for the flash evaporation of effluent containing solids.

When these apparatus are used for the present problem, however, no success is achieved because due to the high viscosity of the preliminary product, the internal walls are only partially wetted so that deposits form on the areas of the wall which are not wetted.

Cyclones are, however, suprisingly found to operate very efficiently with viscous and reactive liquids if the separator chamber consists only of an annular chamber with a sloping discharge surface and a tangentially attached entry box and if the discharge cone of the liquid is directly adjacent the sloping discharge surface without the usual separator chamber.

The cross-section of the entry box is in known manner preferably 8 to 20 times that of the restrictor or product inflow pipe opening into the entry box. This increase in width is preferably abrupt. Before entering the cylindrical annular chamber, the entry box continuously diminishes in width and increases in height so that its cross-sectional area is generally constant.

The entry box is generally so designed that the ratio of its external length to its maximum height is preferably in the region of 2.0 to 3.0.

The entry box is attached to the annular separating chamber in such a manner that its external surface encounters the chamber tangentially.

Instead of having plane lateral surfaces, the entry box may have curved lateral surfaces, as described in German Auslegeschrift No. 23 61 236, with a radius of curvature two times greater than the radius of the annular chamber.

Adiabatic release of pressure takes place almost spontaneously in the entry box, and the ratio of the volume of vapour produced to the liquid volume is in the region of 1000:1, similar to that produced by the flash evaporation described in German Auslegeschrift No. 23 61 236.

A simple cyclone is known (German Offenlegungsschrift No. 22 32 293) which has a longer inlet pipe of larger cross-sectional area attached at its upstream end and into which the liquid which is to be evaporated by pressure loss is introduced tangentially with a sudden increase in cross-section.

In this process, however, the reduction in pressure is deliberately delayed by the formation of a spiralling stream so that some particles evaporate at a higher temperature and others at a lower temperature.

In contrast to the process described in German Auslegeschrift No. 23 61 236, however, the incoming stream of product is not completely broken up into droplets, presumably due to its higher viscosity. A substantial proportion, up to about 30%, is preserved at the centre of the stream as a compact jet. Where the stream encounters a surface, splashes of considerable size are again formed, purely mechanically. If the surface encountered is situated in the annular chamber, these sprays enter the reactor through an immersion tube since they are relatively large and no longer influenced by the stream of gas. It has been found that this may advantageously be avoided by conducting the residual coherent jet downwardly at a flat angle along a parabolic trajectory to the external wall of the entry box.

In order not to inhibit the virtually spontaneous evaporation resulting from the sudden increase in cross-section at the entrance into the entry box, the compact centre of the jet must initially have no contact with the wall of the entry box. It should not encounter the wall until it reaches the second half of the entry box, and preferably not until it reaches the last third of the box. If this is achieved, the pressure increased obtained in the entry box is greater than or equal to the pressure drop in the column reactor.

The droplets formed in the entry box due to the breakdown of the product jet resulting from the spontaneous evaporation, flow down the walls of the box together with the film of liquid formed where the residual core encounters the box, and the film, together with the droplets, then flows over the bottom of the inlet chamber, which is preferably at an angle of 3° to 40° to the horizontal, to enter the separating part.

The separating part now consists only of a cylindrical annular chamber of the same height as the entry box and directly connected to the discharge surface below it.

In the annular chamber, the gaseous phase formed by evaporation is separated from the liquid phase by the centrifugal force acting on the liquid as it rotates in the chamber.

The diameter of the annular chamber depends partly on the space available in the reactor but apart from that, it depends mainly on the quantity of gas liberated by evaporation in the entry box. This in turn depends on the pressure gradient between the product inflow in front of the restrictor and the entry box, the temperature of the entering stream of product and above all on the degree of condensation of the prepolyester product, and must be assessed by calculation or determined experimentally from one case to another.

The discharge surface adjacent to the annular chamber should be at an angle to the horizontal of preferably from 10° to 45°. The slope of the discharge surface depends on the size of the apparatus and on the throughput of the liquid component and its viscosity, and can be determined by experiments on models.

The outlet for the liquid is designed to ensure that there will be no backwash on the discharge surface. It dips into a drip cup which is attached to the reactor plate to prevent gas being discharged at this outlet. The depth of the cup depends on the pressure loss in the cyclone, which is preferably from 0.5 to 2.5 mbar.

The ratio of the diameter of the dip pipe to the diameter of the annular chamber is from 1:3 to 1:6. The ratio of the length immersed to the diameter of the dip pipe is from 0.5 to 1.0.

The cyclone has a circumferential stripping edge in a cover, between the external wall and the dip pipe, and a spray collar on the dip pipe to ensure that liquid creeping along the cover and the dip pipe will not enter the vapour outlet in the dip pipe. A shield in the form of a conical hood is provided over the liquid outlet.

The cyclone may be installed outside the reactor, in which case the liquid discharged from it is returned to the reactor through a pipe. It is then necessary, however, to place a heating jacket around the cyclone to control the temperature since the precondensate entering it may be at temperatures of from 470 to 560 K. Since the fitting of a heating jacket round the cyclone is expensive and time consuming, it has been found preferable to integrate the cyclone with the reactor immediately above the first reactor plate, and the cyclone need not then be heated.

The gas chamber of the reactor generally contains droplets of product formed partly in the course of evaporation of the diol produced by the progressive reaction on the reactor plate of the column and partly in the course of transfer of the product from one reactor plate to another. If the cyclone is situated inside the reactor, these droplets are liable to be deposited on the cover of the cyclone. To prevent this, it has been found advantageous to position the cover of the annular chamber obliquely, at an angle to the horizontal of from 2° to 30° preferably from 5° to 10°. At such an angle, the efficiency of separation is not significantly reduced, and by using the cyclone, the droplets previously formed by spontaneous evaporation in the region of the product inlet pipe can be completely kept away from the vapour stream.

The spinning apparatus used for separating the product droplets from the vapour consists of a distributor with radial blades followed by a cylindrical spin pipe in which the droplets and the gas are separated by centrifugal force.

At the end of the spin separator, the separated liquid is retained by the stripping collar and returned to the first column plate through a discharge pipe with overflow cup, making use of the difference in height.

The spin separator is arranged above the intake cyclone and the first column plate, preferably at a slight inclination to the horizontal to improve the discharge of the liquid component separated in the spin pipe.

The internal diameter of the distributor is from 1.1 to 2 times greater than the diameter of the attached cylindrical spin pipe. The length of the spin pipe is 2 to 3 times greater than its diameter.

The transition from the internal diameter of the distributor to the smaller diameter of the attached spin pipe is by way of a cone shaped element with an overall angle of from 30° to 60°.

The distributor produces a circumferential velocity in the spiralling stream which, based on the diameter of the spin pipe, is from 0.5 to 1.5 times as great as the average velocity of flow through the pipe.

In the spin pipe, the liquid and gaseous phase are separated by centrifugal force. The diameter of the spin pipe depends on the quantity of vapour formed, the magnitude of the pressure loss and the size of the droplets to be separated, and must be adapted to these conditions in each individual case. The pressure loss is normally from 0.5 to 2.0 mbar.

The separating collar is situated at the rear end of the spin pipe. To ensure efficient removal of the separated product droplets, a separating box is provided under the spin pipe, immediately in front of the stripping collar. The product can be discharged into this box from the vapour pipe through several apertures to be subsequently returned to the first reactor plate of the column by way of a discharge pipe with attached discharge cup. The length of the discharge pipe is preferably calculated so that the cup is situated immediately above the layer of liquid on the first reactor plate. The cup has a plurality of small discharge apertures, big enough to ensure that the cup is automatically emptied when the reactor is at a standstill but small enough to ensure that the cup remains filled while the reactor is in operation.

If desired, the liquid product separated in the spin separator may be returned to the entry box of the cyclone at the point where there is a sudden increase of width from the product inflow pipe to the entry box. In order to enable the product to be discharged from the spin separator to this part of the entry box, however, this part of the entry box must be at a low pressure compared with the reactor chamber over and above the pressure drop of the spin separator. This is achieved by suitably designing the entry box so that its width increases in several stages to from 5 to 30 times that of the product inflow pipe. If these stages are suitably designed, the pressure increase from the first sudden increase in the entry box width immediately behind the product inflow to the inlet opening into the cyclone is greater than the pressure drop produced by the flow of gas in the cyclone and in the spin separator.

It has been found advantageous to increase the width of the first stage to from 2 to 4 times that of the product inlet and to increase the cross-sectional areas of each of the subsequent stages of a factor of from 2 to 8 compared with the preceding stage. It has been found advantageous to design the last stage so that it has a rectangular cross-section and continuously decreases in width from the beginning until its entry into the cyclone while its height continuously increases.

The stages of the entry box preceding the last stage may be cylindrical. The length of a stage should be 2 to 5 times its diameter.

The length of the last stage, which is rectangular in cross-section, is approximately 1.5 to 5 times its greatest height.

When these dimensions are employed, the product separated in the spin separator can easily be introduced into the entry box and mixed with the stream of preliminary product.

With such an arrangement, approximately 5 to 10% of the vapour is returned from the spin separator to the cyclone together with the separated product. This quantity of returned vapour does not interfere with the flow of gas in the cyclone but rather increases the efficiency of the cyclone.

The cyclone and spin separator provide an optimum solution to the given problems while providing the maximum economy of means and minimum expenditure.

The process according to the invention will now be described in more detail with reference to FIGS. 2 to 5.

Figure 2:
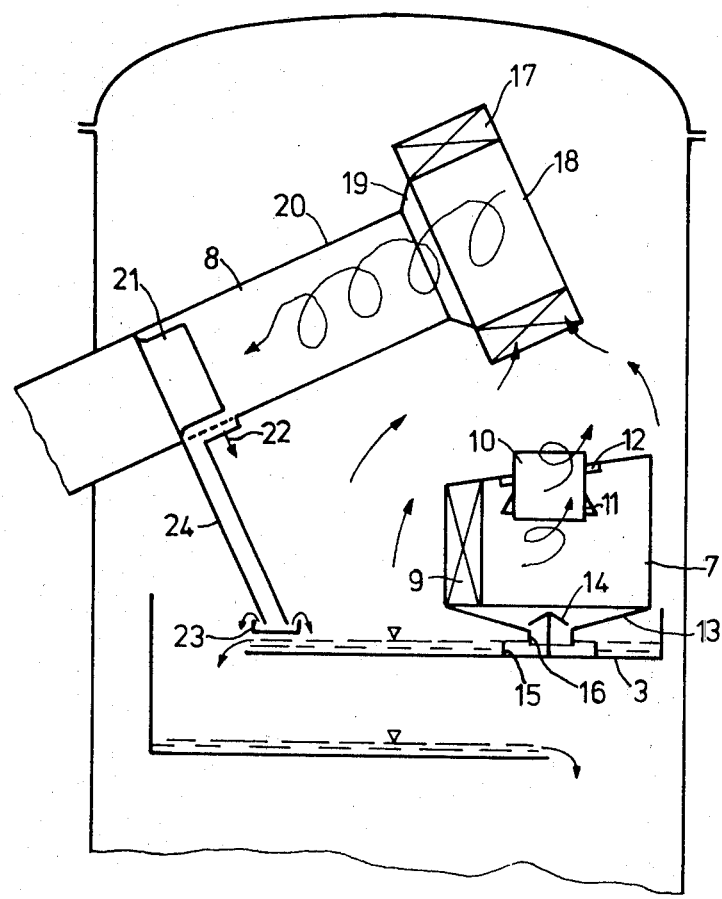

FIG. 2 shows the arrangement of an intake cyclone and of a spin separator in the upper part of a plate column comprising an uppermost plate 3, a cyclone 7 on this plate, and a spin separator 8 above it.

The reference numeral 9 denotes an annular chamber of the cyclone provided with a dip pipe 10 having a spray collar 11 and stripping edge 12 laterally thereof.

The reference numeral 13 denotes a sloping discharge surface provided with conical shield 14 and product outlet 16 protected by a drip cup 15.

The spin separator 8 comprises a distributor 18 equipped with blades 17 and connected to a spin pipe 20 by way of a short conical pipe element 19. At the other end of the apparatus are a separating collar 21 and a separating box 22 with discharge pipe 24 again connected to a drip cup 23.

Figure 3:
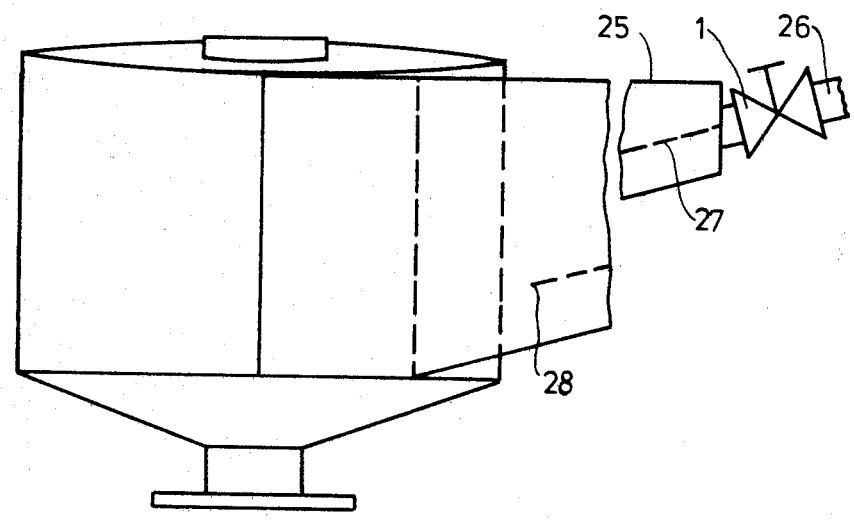

FIG. 3 is a side view of the cyclone with a shortened view of an inlet channel 25 and inlet pipe 26 including a restrictor 1.

Figure 4:
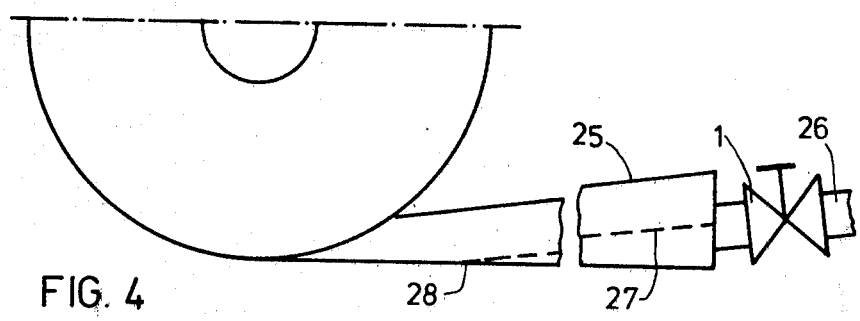

FIG. 4 is a top plan view. The direction of a product stream 27 and the position 28 at which it meets the wall of the apparatus are indicated in FIGS. 3 and 4.

Figure 5:
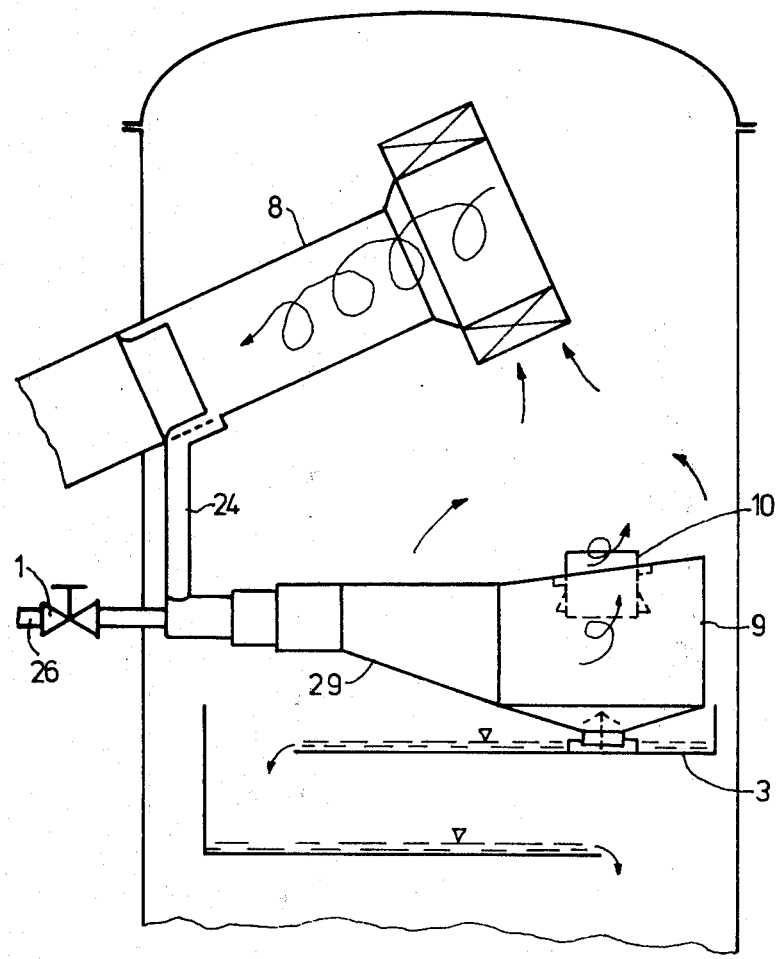

FIG. 5 shows the arrangement of spin separator and cyclone, illustrating how the separated product is returned to the cyclone through an inlet box which widens out in several stages.

The reference numeral 26 denotes a product inflow pipe with the restrictor 1 leading from the precondensation reactor, and 29 denotes the inlet box which widens out in stages and is tangentially attached to the annular chamber 9 of the cyclone containing the dip pipe 10.

The reference numeral 3 denotes the first plate of the reactor, 8 denotes the spin separator and 24 the discharge pipe.

We claim:

1. A process for the production of polyesters by the introduction on to a first plate of a column reactor of precondensates obtained from a transesterification of dicarboxylic acid dialkyl esters with diols or from an esterification of dicarboxylic acids with diols, optionally with the addition of catalysts, and subsequent condensation in the column reactor, characterised in that spontaneous flash evaporation of the precondensate due to the pressure gradient between the precondensation reactor and the column reactor takes place in a closed chamber, a so-called entry box, before the introduction on to the first plate of the column reactor, and in that separation of the liquid component from the gaseous component is subsequently carried out by centrifugal force in a functionally separated region, a so-called annular chamber.

2. A process according to claim 1, characterised in that the residual core of product stream entering the entry box is directed obliquely towards an outer surface of the entry box so that it encounters this wall in the second half, preferably in the last third, and that a pressure increase which is greater than or equal to the pressure drop in the column reactor is produced in the entry box.

3. A process according to claim 1, characterised in that the flash evaporation is carried out in a cyclone which is equipped in known manner with an entry box set tangentially to the annular chamber, which entry box increases in cross-section to from 5 to 30 times that of the product pipe entering it, and becomes progressively narrower and progressively higher before its entry into the annular chamber, and in that its external length is from 1.5 to 5 times its height, in that cross-section of a central dip pipe in the cover of the cyclone is from 0.75 to 1.5 times the final cross-section of the entry box, in that the diameter of the annular chamber is from 3 to 5 times as great as the diameter of the dip pipe, and in that the ratio of the depth of immersion of the dip pipe in the cyclone to its diameter is from 1 to 1.5, in that the cyclone is provided with a stripping edge, a spray collar attached to the dip pipe, and a shield in the form of a hood above the discharge pipe and in that the discharge pipe is surrounded by a drip cup, in that the cover of the annular chamber is sloping and in that the angle of inclination to the horizontal is from 0° to 30°, and in that the cyclone is situated inside the column reactor.

4. A process according to claim 1, characterised in that the vapours of a diol formed on the plate of a column reactor during the continuous condensation are freed from the absorbed product droplets by centrifugal force immediately before their exit from the reactor, and in that these separated portions of liquid product are returned to one of the plates of the reactor.

5. A process according to claim 4, characterised in that the separation of the product droplets takes place in a spin separator consisting of a radial distributor, a conical transition element and a cylindrical spin pipe, in that the distributor is equipped with at least 4 straight or curved blades, in that the diameter of the cylindrical spin pipe is from 0.5 to 0.8 times the internal diameter of the distributor and the length of the spin pipe is from 1 to 3 times its diameter, and a separating collar having a diameter ca. 0.9 to 0.7 times the diameter of the spin pipe is situated at the end of the said pipe, in that apertures are provided on the underside of the spin pipe, directly in front of the separating collar, and in that situated underneath these apertures is a separating box to which the product discharge pipe is attached.

6. A process according to claim 5, characterised in that the polymer droplets separated in the spin separator are returned to the evaporation box of the cyclone.

7. A process according to claim 6, characterised in that the width of the entry box increases by several stages to from 5 to 30 times that of the product pipe entering it, the first stage widening by 2 to 4 times and the cross-sectional area of each of the subsequent stages being from 2 to 8 times greater than that of the preceding stage, and all sections of the entry box with the exception of the last stage may be cylindrical in cross-section but the last stage is rectangular in cross-section and, in that the length of the stages which are cylindrical in cross-section is ca. 2 to 5 times as great as their diameter, and in that the last stage continuously increases in width before its entry into the annular chamber and in that the length of this last stage is from 1.5 to 5 times its greatest height, and in that the discharge pipe of the spin separator is attached to the entry box laterally immediately after the opening of the product pipe into the box.

* * * * *